Patented May 25, 1954

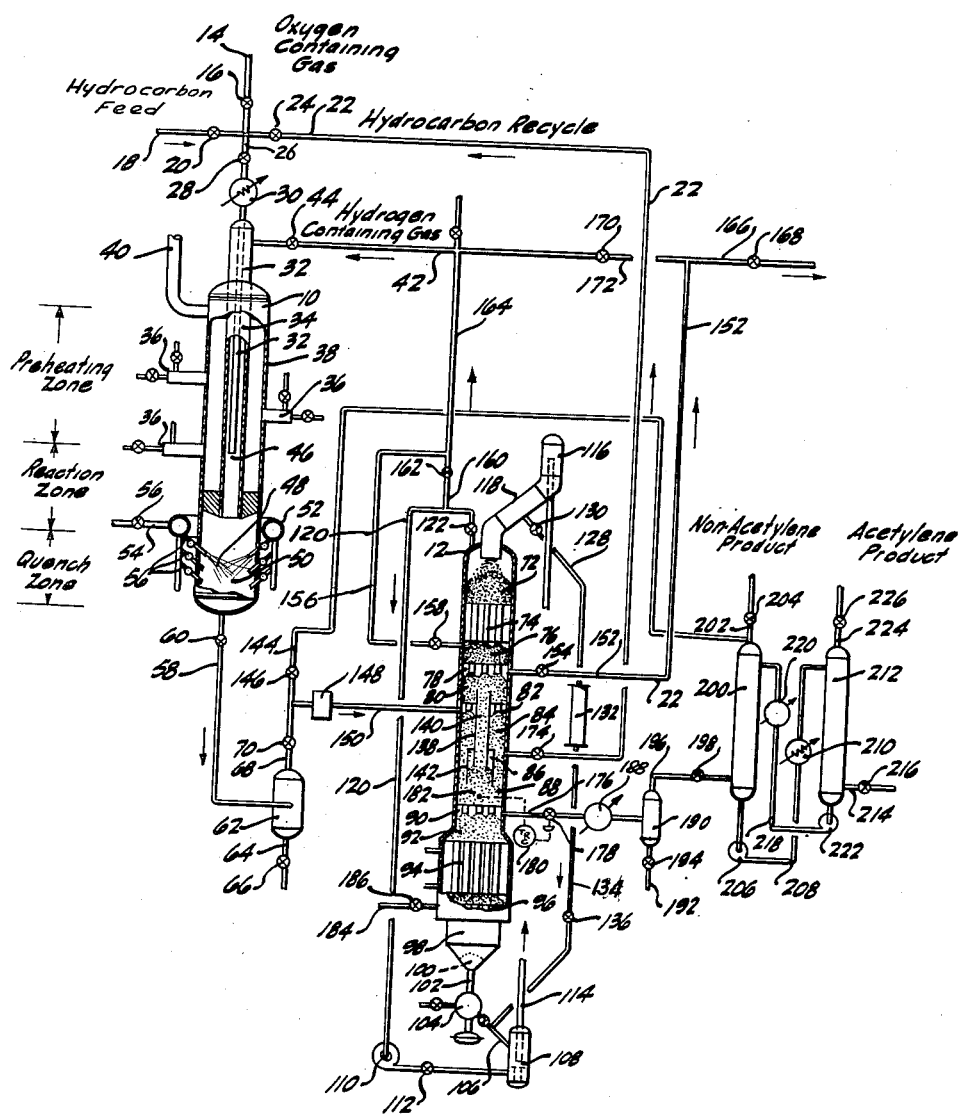

2,679,540

UNITED STATES PATENT OFFICE 2,679,540

PROCESS AND APPARATUS FOR ACETYLENE PRODUCTION

Clyde H. O. Berg, Long Beach, Calif., assignor to Union Oil Company of California, Los Angeles, Calif., a corporation of California Application July 28, 1950, Serial No. 176,475

29 Claims. (Cl. 260—679)

This invention relates to the high temperature conversion of hydrocarbons and relates to the production of unsaturated hydrocarbons such as the acetylenes. In particular the present invention relates to an improved process for the efficient conversion of hydrocarbons to acetylenes assisted by a conversion effluent separation from which a portion of the gases separated from the acetylene is returned and injected into the conversion process whereby increased acetylene yields and other advantages are obtained.

The production of acetylene by the partial oxidation of hydrocarbon vapors or gases is well known. Good yields of acetylene are obtained only at relatively high temperatures of the order of 1500° C. At these temperatures appreciable quantities of acetylene are formed but the products must be rapidly cooled or quenched to inhibit undesired side reactions which consume the acetylene thus formed. Furthermore, it has heretofore been found that the highest yields of acetylene are obtained when oxygen of relatively high purity is employed as the oxidizing medium. Because of the expense of producing high purity oxygen in quantities necessary for such a partial oxidation operation many unsuccessful attempts to develop a commercially feasible process using air as the oxidizing medium have been made. The problems encountered included a requirement of higher temperatures because of the lower oxygen partial pressure, but primarily the great quantities of diluent nitrogen in the product gases adversely affect the customary procedures for recovering the acetylene produced. With oxygen as the oxidizing medium the usual acetylene yields are about 40% based on the hydrocarbon consumed and yields with air at best are somewhat less.

The present invention is therefore directed to an improved process and apparatus for the production of acetylene using air as the oxidizing medium in which a combination of a partial oxidation step and an effluent gas purification cooperatively cofunction together to permit acetylene yields appreciably greater than those heretofore obtained with pure oxygen as the oxidizing gas and wherein the presence of nitrogen exerts no adverse effect on the handling and separation of the effluent gases.

It is a primary object of the present invention to provide a combination acetylene production and purification process wherein a gaseous or vaporous hydrocarbon is partially oxidized with an oxygen-containing gas such as air and the effluent gases therefrom are separated by contact with a continuously moving bed of solid granular adsorbent.

It is an additional object of this invention to provide an acetylene production process wherein hydrocarbon gases or vapors are subjected to partial combustion in a reaction initiated by injecting a hydrogen-containing gas into the preheated reactant gases.

Another object of this invention is to provide in the combination process a separation step in which a hydrogen-containing gas containing a controlled quantity of an inert diluent gas is produced from the acetylene-bearing effluent and recirculated to the acetylene production step.

A further object of this invention is to provide a separation step wherein acetylene is separated from other gases at moderately high pressures in the presence of a recirculating stream of a stabilizer gas and which pressure is sufficient to partially separate hydrogen from nitrogen in the effluent from the acetylene production step.

A further object of this invention is to provide an apparatus capable of achieving the foregoing and other objects.

Other objects and advantags of the present invention will become apparent to those skilled in the art as the description thereof proceeds.

Briefly, the present invention comprises a combination process for the production of acetylene in which hydrocarbon vapors or gases are partially oxidized at elevated temperatures in the presence of an oxygen-containing gas such as air. It has been found by preheating a reactant gas mixture of light hydrocarbon and oxygen-containing gas to temperatures as high as 900° C. that substantially no reaction occurs until an introduction of hydrogen-containing gas into the preheated reactant gas mixture. The effect of this gas on the preheated reactant gas is considerable in that it initiates the acetylene-producing reaction as well as having other numerous beneficial effects. These include a considerable lowering of the required preheat temperatures necessary for high acetylene yield, the elimination of the formation of free carbon which is found in nearly all acetylene production processes, and the successful inhibition of the usually substantial oxidation of hydrocarbon to carbon dioxide. The effluent gas product after a short reaction of time of controlled duration is quench cooled and the cooled gases are then compressed if necessary and introduced into the separation stage of the combination process of the present invention.

In the separation stage a moving bed of granular adsorbent is employed as a separating medium for the numerous gaseous constituents present in this product gas. The separation is carried out at moderately elevated pressures between about 100 and 350 pounds per square inch at which carbon dioxide and acetylene are produced together in a single stream substantially free of other constituents. The carbon dioxide present in this stream has a stabilizing effect on the acetylene at the elevated pressures employed and which prevents its decomposition. Simultaneously an adsorptive enrichment of the hydrogen is carried out whereby a hydrogen-rich mixture containing nitrogen and some carbon monoxide is produced. This gaseous mixture has been found effective in initiating the acetylene-producing reaction in the partial combustion stage. The advantage of such an adsorptive separation stage includes the ability of such a process to produce a hydrogen-rich gas at moderate pressures and in the absence of a customary extreme refrigeration temperature. A recirculating stream of carbon dioxide separated from the acetylene product is mixed with the effluent gas from the acetylene reactor to bring the carbon dioxide content up to the value sufficient to prevent acetylene decomposition and the mixture is introduced into the adsorptive separation stage.

The process and apparatus of the present invention will be more clearly understood from the description of the accompanying drawing in which a schematic flow sheet for the acetylene production process is shown.

Referring now more particularly to the drawing, acetylene-producing reactor 10 and adsorptive separation column 12 are shown. Referring in particular to acetylene reactor 10 an oxygen-containing gas such as air is introduced via line 14 at a rate controlled by valve 16 and is combined with fresh hydrocarbon gas or vapor passing through line 18 at a rate controlled by valve 20. Unreacted hydrocarbon as a recycle stream flowing via line 22 at a rate controlled by valve 24 is also introduced forming a reactant gas mixture having a controlled proportion of hydrocarbon to oxygen. This reactant gas is subsequently passed via line 26 at a rate controlled by valve 28 into reactant gas preheater 30 wherein the temperature is raised prior to introduction into acetylene reactor 10. The preheated reactant gases are subsequently passed through tube 32 supported within outer tube 34 within acetylene reactor 10, a plurality or only a single pair of inner and outer tubes shown may be employed.

The upper portion of reactor 10, or that part surrounding tube 32 comprises a preheating zone, heat being added by means of burners 36 which may be, if desired, gas fired burners of conventional design firing into the annular space between shell 38 of reactor 10 and outer tube 34. A stack 40 is provided for the removal of flue gases from the preheating zone. The hydrogen-containing gas described above and used for initiating the acetylene-producing reaction is introduced into the annular space between inner tube 32 and outer tube 34 by means of line 42 controlled by valve 44. This gas is also preheated while passing through the preheating zone.

That part of outer tube 34 between inner tube outlet 46 and quench 48 is the reaction zone within which the production of acetylene occurs.

Variation in the reaction time may be effected in one of several ways. First, the flow rate of gases through the reaction zone may be increased or decreased to change the reaction time. Once an optimum linear reactant gas velocity is determined the duration of the reaction may be further varied by altering the position of quench 48 within quenching zone 50. In the type of quenching shown in the drawing, cold water is sprayed into the hot effluent gases at a sufficient rate cooling the reactant gases to stop the acetylene-producing reaction and prevent undesirable side reducing reaction and prevent undesirable side reactions. In this quenching zone header 52 is provided having inlet pipe 54 controlled by valve 56 whereby cold water or other quench fluid is introduced. Individual spray nozzles 56 are provided with valves whereby the water is directly injected into the quenching zone. A plurality of nozzles or inlets for quenching fluid are provided along the length of the quenching zone thereby making the distance over which the reacting gases pass before quenching and consequently the reaction time controllable within relatively wide limits. If desired, the quenching zone may be made substantially the same diameter as outer tube 34 or the diameter may be somewhat larger as shown in the drawing.

The quenched mixture of acetylene-bearing product gas and quenching fluid is removed from the quenching zone 50 by means of line 58 controlled by valve 60 and is introduced into vapor liquid separator 62 wherein the quenching fluid is separated from the cooled effluent gas. The quenching fluid is removed from separator 62 via line 64 controlled by valve 66 which may be actuated, if desired, by a liquid level controller not shown which maintains a liquid level in the separator. The quenched product gases are removed from the separator by means of line 68 at a rate controlled by valve 70 and are subsequently sent to the effluent gas purification stage of the process for acetylene recovery.

Referring now particularly to adsorptive separation column 12, the column is provided at successively lower levels therein with hopper zone 72, cooling zone 74, secondary adsorption zone 76, lean gas product disengaging zone 78, primary adsorption zone 80, feed gas engaging zone 82, primary rectification zone 84, side cut gas disengaging zone 86, secondary rectification zone 88, rich gas product disengaging zone 90, adsorbent stripping zone 92, adsorbent heating zone 94, stripping gas engaging zone 96, adsorbent feeder zone 98 wherein adsorbent circulation is controlled, and bottom zone 100. The adsorbent is introduced into the top of the column and passes downwardly successively through the aforementioned zones as a substantially compact moving bed of granular adsorbent. The adsorbent is removed from bottom zone 100 and passed through sealing leg 102 into adsorbent flow control valve 104, the operation of which maintains a constant adsorbent level in bottom zone 100. The adsorbent passes from zone 104 through transfer line 106 into adsorbent induction zone 108. Herein a conveyance gas recirculated by means of conveyance gas blower 110 controlled by valve 112 forms a suspension of solid granular adsorbent which is conveyed via conveyance line 114 into impactless separator 116. Herein the suspension is broken and the solid granular adsorbent and the conveyance gas pass as substantially independent phases via transfer line 118 into hopper zone 72 above described. The conveyance fluid is removed from the top of column 12 via line 120 at a rate controlled by valve 122 and is returned to the suction inlet of blower 110. In this fashion a continuous recirculation of solid granular adsorbent passing downwardly through column 12 and upwardly through conveyance line 114 is maintained, the adsorbent passing successively through zones of cooling, adsorption, a plurality of rectification zones, and stripping and heating zones.

A portion of the thus recirculating adsorbent is removed from transfer line 118 via line 128 controlled by valve 130 and is subjected to reactivation conditions of high temperature and the presence of a reactivating gas in reactivation zone 132. The reactivated adsorbent is removed therefrom via line 134 at a rate controlled by means 136 and introduced into transfer line 106 for recirculation in the system.

Contained within column 12 and extending between adsorption zone 80 and through primary rectification zone 84 is tertiary tube 138 containing tertiary rectification zone 140 therein. Tertiary tube 138 brings adsorbent from the upper portion of adsorption zone 80 where it is free of rich gas constituents downwardly therethrough and introduces it below side cut product disengaging zone 86. This disengaging zone comprises an annular volume formed between the lower portion of tertiary tube 138 enclosed within a somewhat larger tube 142. The body of adsorbent contained within tube 142 is in reality an extension of secondary rectification zone 88 the operation and performance of which will be subsequently described.

The cooled effluent gases containing acetylene are then combined with a recirculating inert gas stream such as carbon dioxide flowing via line 144 at a rate controlled by valve 146 to form a gaseous mixture in which the carbon dioxide content is raised to a predetermined value in relation to the acetylene content of the gas whereby acetylene is stabilized at elevated pressures. The gaseous mixture is subsequently compressed, if necessary, in compressor 148 to a moderately high pressure at which the adsorptive separation step is carried out. This pressure may be between 50 and 500 pounds per square inch and a preferable operating pressure lies between 75 and 250 pounds per square inch. The thus compressed feed gas is passed via line 150 into feed gas engaging zone 82. The gas thus introduced contains hydrogen, nitrogen, carbon monoxide, methane, carbon dioxide, acetylene, ethylene, ethane and traces of higher molecular weight hydrocarbons.

Upon passage of this gaseous mixture through adsorption zone 80 all constituents but hydrogen, nitrogen and carbon monoxide are adsorbed on the adsorbent between the feed gas engaging zone 82 and the upper open inlet of tertiary tube 138. The effect of this is to saturate the adsorbent introduced into tertiary tube 138 with hydrogen, nitrogen and carbon monoxide only and maintain it substantially free of methane, carbon dioxide and the $C_2$ hydrocarbons. The unadsorbed hydrogen, nitrogen and carbon monoxide are at least partly removed from lean gas disengaging zone 78 via line 152 controlled by valve 154 while the remaining portion thereof passes upwardly through secondary adsorption zone 76 wherein at least part of the nitrogen and carbon monoxide is adsorbed forming a hydrogen-enriched overhead gas product. In one modification this enriched hydrogen gas is removed from a point just below cooling zone 74 via line 156 at a rate controlled by valve 158 and recirculated to the acetylene-producing zone as the hydrogen-containing gas. In another modification valve 158 is at least partly closed and this unadsorbed gas forced countercurrent to the adsorbent through cooling zone 74 and hopper zone 72 to form a more highly hydrogen-enriched gas. In the latter case the conveyance fluid comprises a portion of this purge gas and the hydrogen-containing gas recirculated to the acetylene-producing zone may be removed from line 120 via line 160 controlled by valve 162 and conveyed via lines 164 and 42 to the acetylene process. When the nitrogen, hydrogen and carbon monoxide are passed as a purge gas through the cooling zone an increased degree of hydrogen enrichment is effected as well as desorbing residual quantities of moisture from the adsorbent. The purge gas further is preheated by direct contact with the hot adsorbent and aids in cooling the latter during its passage through the hopper and cooling zones. Hydrogen-containing recycle gases containing a wide variation in hydrogen concentration are obtained by blending in various proportions the three hydrogen-containing streams mentioned; namely, the lean gas product removed from zone 78, the partially enriched hydrogen-containing gas removed from the top of secondary adsorption zone 76 and the fully enriched purge gas removed from the top of column 12.

In usual operations the lean gas product passing via line 152 is vented via line 166 at a rate controlled by valve 168 from the system, valve 170 in line 172 being closed, and part of the nitrogen and carbon monoxide are vented from the system. Enriched hydrogen-containing gas is recirculated from either secondary adsorption zone 76 or the top of column 12 to the acetylene process.

The rich adsorbent removed from adsorption zone 80 passes downwardly into primary rectification zone 84 wherein it is contacted by a countercurrent flow of reflux gas containing carbon dioxide, methane, and $C_2$ hydrocarbons. A refluxing action occurs which desorbs less readily adsorbable hydrogen, nitrogen, and carbon monoxide from the adsorbent forming a rectified adsorbent. The rectified adsorbent passes downwardly into secondary rectification zone 88 wherein it is contacted with a reflux gas containing carbon dioxide and $C_2$ hydrocarbons. Another active refluxing step occurs in which methane is desorbed from the adsorbent a portion of which passes within secondary tube 142 countercurrent to the adsorbent introduced thereinto via tertiary tube 138. The desorbed methane accumulates in side cut disengaging zone 86. A portion of this desorbed methane passes upwardly through tertiary tube 138 effecting an active refluxing step in which the adsorbent passing downwardly therethrough is freed of its adsorbed hydrogen, nitrogen and carbon monoxide constituents. The adsorbent thus discharged from tube 138 into tube 142 is saturated with substantially pure methane. The methane is desorbed from the adsorbent in rectification zone 88 as described and is removed from side cut product disengaging zone 86 via line 22 controlled by valve 174. This methane is recirculated as described to the acetylene-production step.

The rectified adsorbent is passed from both parts of secondary rectification zone 88 (within and outside of tube 142 as well as below it) into stripping zone 92 wherein it is countercurrently contacted with a stripping gas by means of which the carbon dioxide and $C_2$ hydrocarbons including acetylene are preferentially desorbed. A portion of these desorbed constituents are employed in secondary rectification zone 88 as reflux while the remainder thereof is removed from disengaging zone 90 via line 176 at a rate controlled by valve 178 actuated by temperature recorder controller 180 under the influence of thermocouple point 182 in contact with the adsorbent in secondary rectification zone 88. Reflux control is thus maintained since as greater quantities of reflux, provided by closing valve 178, pass into rectification zone 88 the adsorbent temperature increases as the heavier constituents are adsorbed and the heat of adsorption is released.

The partially stripped adsorbent in stripping zone 92 subsequently passes through the tubes of heating zone 94 wherein the charcoal is heated and contacted with further quantities of stripping gas introduced into the stripping gas engaging zone 96 via line 184 controlled by valve 186. The presence of stripping steam in the heated adsorbent effects desorption or stripping of the residual adsorbed constituents and at the same time sufficiently reduces the partial pressure of the acetylene and carbon dioxide to prevent decomposition thereof. The desorbed gases then flow into stripping zone 92 and are removed with the desorbed gases there from rich gas disengaging zone 90 as described. The desorbed rich gas together with stripping steam is passed via line 176 into condenser 188 in which the stripping steam is condensed. The steam condensate is separated from the cooled desorbed gas in separator 190 and removed therefrom via line 192 controlled by valve 194. The cool rich gas, consisting essentially of carbon dioxide as a stabilizing agent and the acetylene containing $C_2$ hydrocarbon fraction, passes subsequently via line 196 through depressuring valve 198 into the solvent-extraction system wherein carbon dioxide and $C_2$ hydrocarbons are separated from the acetylene.

Preferably the acetylene-extraction system is maintained at a pressure of about 20 pounds per square inch gauge. The acetylene-bearing gases are first contacted in absorber 200 with a countercurrent flow of solvent such as dimethoxy tetramethylene glycol or other solvent having a high adsorbent power for acetylene but not for carbon dioxide. The unadsorbed gases are removed therefrom via line 202 controlled by back pressure regulator 204. The rich solvent is passed via pump 206 and line 208 through heater 210 into solvent stripper 212. Herein the rich solvent is countercurrently contacted with a stripping gas introduced via line 214 controlled by valve 216 into the bottom. The hot lean absorbent is passed via line 218 and solvent cooler 220 by means of pump 222, the cool solvent being returned to the top of absorber 200. The acetylene stripped from the solvent in stripper 212 is removed therefrom via line 224 controlled by back pressure regulator 226 and is sent to further processing or storage facilities not shown. The purity of the product thus treated is usually better than 95% and can be made as high as 98% by volume pure acetylene.

If desired, in a subsequent absorption step carbon dioxide may be separated from the hydrocarbon constituents present in the gas removed overhead from absorber 200. This mixture of carbon dioxide and $C_2$ hydrocarbons may be at least partially returned to be combined as a stabilizing gas with the cooled effluent from the acetylene process as described above to prevent decomposition of the acetylene as it is purified in adsorptive separation column 12 or pure carbon dioxide separated from the nonacetylene hydrocarbons may be recycled. Thus within the column about 30% by volume to as high as about 50% by volume of pure carbon dioxide or between about 35% to 60% by volume of the mixture of carbon dioxide and nonacetylene $C_2$ hydrocarbons is maintained between the feed gas inlet and the rich gas outlet of the column in which the temperature ranges from 100° F. to about 180° F. In stripping zone 92 and heating zone 94 where the temperatures range from 180° F. to about 350° F. as a maximum the acetylene is stabilized by the presence of considerable quantities of steam, the gas phase present in the heating zone analyzing perhaps as high as 90 volume per cent steam or higher.

Thus in the purification step of the process of the present invention moderately high pressures in a particular range are employed in the purification of acetylene permitted by the use of a recirculating stabilizing gas as described. Simultaneously at these pressures a partial separation of hydrogen from nitrogen is effected supplying the hydrogen-containing recycle gas essential to the proper operation of the acetylene producing step, and which has a composition which is even more effective in promoting the acetylene reaction than pure hydrogen.

The operation of the present invention is illustrated by the following examples:

EXAMPLE

A reactant gas mixture was prepared containing 24.6% by volume of methane and 75.4% by volume of air. This gaseous mixture was preheated to a temperature of about 1150° C. and was passed at a rate of 815 volumes per hour at standard conditions into a reactor such as that shown in the drawing. A hydrogen-containing gas diluted with nitrogen was introduced as shown in the drawing at a rate of 600 volumes per hour and in which the percentage of hydrogen was varied. The reaction time was controlled in all cases to 0.008 second. The acetylene yield based upon the quantity of methane consumed is given as follows:

| Percent Hydrogen by Volume in Hydrogen-Nitrogen Recycle Gas | Acetylene Yield, Percent |
| --- | --- |
|  | 44.1 |
| 100 | 50.8 |
| 95 | 53.4 |
| 90 | 53.4 |
| 75 | 53.2 |
| 66 | 50.0 |
| 50 | 45.6 |
| 33 | 30.2 / 31.4 |
| No recycle gas |  |

It is seen from the foregoing data that the percentage yield of acetylene in the process is strongly determined by the analysis of the hydrogen-containing recycle gas and that improved results are obtained when this gas contains between about 40% to as high as about 95% hydrogen. However, preferably the gas contains between about 60% hydrogen and about 90% hydrogen, the remainder being nitrogen and carbon monoxide.

In the adsorptive separation of the gaseous effluent from the conversion acetylene production process various adsorbents are applicable such as silica gel, activated aluminum oxide, activated charcoal and other well known adsorbents. The preferred adsorbent is charcoal.

A typical analysis of a product gas such as that obtained according to the process described is given as follows:

*Effluent composition*

| Component | Mol Percent |
|---|---|
| Hydrogen | 45.0 |
| Nitrogen | 42.6 |
| Carbon Monoxide | 2.3 |
| Oxygen | 0.1 |
| Methane | 6.2 |
| Carbon Dioxide | 0.2 |
| Acetylene | 3.1 |
| Ethylene | 0.5 |
| Total | 100.0 |

In the adsorptive separation of such gaseous mixtures it is preferred that between about 100 and 350 pounds of activated charcoal be employed per thousand standard cubic feet of gaseous mixture to be separated including the recirculated stabilizing gas for the acetylene. In most cases when operating at pressures of about 100 pounds per square inch with gases having an analysis such as that given above, the charcoal rate of between about 150 and 225 pounds per thousand standard cubic feet of gas is sufficient. At higher pressures correspondingly less adsorbent is required and at lower pressures more adsorbent is required.

The stabilizing gas used is preferably of about the same degree of adsorbability as acetylene such as ethylene, ethane and carbon dioxide. However, less readily adsorbable stabilizers such as methane is included in the group of operable stabilizing agents, though less preferable, as are the more readily adsorbable agents such as $C_3$ and $C_4$ hydrocarbons, saturated or unsaturated.

The amount of such stabilizing gas required increases with the operation pressure, the concentration of acetylene in the rich gas product and varies with the type of stabilizing gas. Carbon dioxide, ethane, propane, or butane and such gases may be employed, but preferably carbon dioxide or propane. At higher pressures a higher concentration of stabilizing gas is required. Within the preferred operating pressure range of 75-250 pounds per square inch given above, between about 40% and 50% carbon dioxide, 30 and 40% ethane, 25 and 30% propane or 20-30% butane based on the quantity of acetylene in the feed gas is required. In other words, sufficient amounts of the stated gases should be injected into the adsorber feed gas to bring their concentrations in the feed stream up to within the stated percentages of the acetylene concentration in the feed in order to stabilize the acetylene product at the desorption conditions. At lower percentages an insufficient stabilization is obtained and at higher percentages an undue "loading" of the desorption section of the column is obtained. Thus the stated stabilizing gas percentages are preferred.

In the acetylene-production step of the process according to this invention the hydrocarbons suitable for conversion include the normally gaseous hydrocarbons, i. e. the saturated and unsaturated members having from 1 to 4 carbon atoms per molecule as well as the lighter normally liquid members of the series having from 5 to about 10 carbon atoms per molecule. It is preferred that natural gas be employed as the hydrocarbon portion of the reactant gas mixture although as shown in the illustration pure methane or mixtures with ethane and propane or those gases by themselves may be employed. The light normally liquid hydrocarbon for these may be vaporized and the vapor treated according to the present invention.

The oxygen-containing gas may be pure oxygen, although air is preferred. Oxygen-enriched air may also be employed.

The proportion of oxygen employed is between about 20% and about 50% in excess over the theoretical quantity required to convert the hydrocarbon employed to acetylene. When methane is employed the ratio of hydrocarbon to oxygen is preferably greater than 1.33 such as for example between about 1.33 and 2.0. Preferably with methane the ratio is between about 1.5 and 1.8. In the conversion of natural gas with air a suitable range of mixtures includes those containing between 17% and 30% by volume of natural gas.

In the hydrogen-containing recycle gas it is preferred to have between 40% and 10% inert gas such as nitrogen or carbon monoxide or both, and between about 60% and about 90% of hydrogen.

The recycle rate of hydrogen with respect to the quantity of hydrocarbon employed in the reactant gas may vary between 0.5 and about 5.0 mols of hydrogen per mol of hydrocarbon with about 1.5 to 3.0 mols per mol being preferred.

The reaction temperature is between about 1100° C. and 1500° C. and preferably between about 1275° C. to 1375° C. The temperature to which the reactant gases are preheated directly controls the reaction temperature and usually lies between about 950° C. and 1150° C. It is preferred that the preheating be effected in between about 0.005 and about 0.5 second in order to inhibit premature and undesired reactions. The actual reaction time after hydrogen-containing gas addition may be varied from 0.001 to 0.05 second, the preferred reaction time range being 0.002 and 0.02 second.

The gases removed from the reaction zone are immediately quenched preferably to a temperature less than about 650° C. since above this temperature loss of acetylene is apt to occur. Quenching below this temperature is not necessarily required but since the gas must be ultimately cooled to substantially atmospheric temperature for introduction into the adsorption separation step quenching to an atmospheric temperature is desirable. Part of the heat employed may be recirculated to the reactant gases by bringing these two streams into heat exchange relation. Additional quantities of this heat may be dissipated in a waste heat boiler supplying the steam required in the process, for example, as in stripping of the rectified adsorbents in the adsorptive separation.

The reaction pressure is preferably near atmospheric, although pressures in the range of from 5 to about 50 pounds per square inch absolute may be employed.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for producing acetylene which comprises reacting a preheated reactant gas mixture of hydrocarbon and an oxygen-containing gas by non-catalytic partial oxidation at an elevated temperature in a reaction zone to form a conversion effluent containing acetylene and unreacted hydrocarbon, injecting thereinto an acetylene stabilizing gas selected from the group consisting of carbon dioxide, ethane, propane and butane, then contacting the effluent subsequently with a moving bed of solid granular adsorbent to separate said acetylene and said unreacted hydrocarbon from less readily adsorbable conversion products and hydrogen as an unadsorbed gas, separating streams of unreacted hydrocarbon and a gas enriched in hydrogen from said adsorbent, recirculating said unreacted hydrocarbon for reaction with further quantities of said oxygen-containing gas, recirculating at least part of said gas enriched in hydrogen to initiate the reaction by injection into said preheated mixture of hydrocarbon and oxygen-containing gas in said reaction zone and purifying said acetylene produced.

2. A method for producing acetylene which comprises preheating a reactant gas mixture of an oxygen-containing gas and a hydrocarbon in the vapor phase, injecting a hydrogen-containing gas into said mixture thereby initiating the non-catalytic partial oxidation acetylene-producing reaction and forming an acetylene-containing effluent, cooling said effluent, injecting thereinto an acetylene stabilizing gas selected from the group consisting of carbon dioxide, ethane, propane and butane, contacting the cooled effluent gas under a relatively high pressure sufficient to permit the separation of hydrogen from carbon monoxide with a moving bed of solid granular adsorbent to adsorb acetylene and more readily adsorbable constituents leaving less readily adsorbable constituents and hydrogen substantially unadsorbed, separating a gas enriched in hydrogen from said adsorbent, recirculating at least part of the thus enriched gas for injection into the preheated reactant gas mixture to initiate the acetylene-producing reaction and desorbing acetylene from said adsorbent.

3. A process for the production of acetylene which comprises the steps of preheating a reactant gas mixture containing a normally gaseous hydrocarbon and an oxygen-containing gas to an elevated temperature insufficient to cause substantial reaction, injecting a gas containing hydrogen into the preheated reactant gas mixture to initiate a non-catalytic partial oxidation acetylene-producing reaction, quenching the effluent gases within from 0.001 to 0.05 second after the initiation of said reaction, injecting an acetylene stabilizing gas selected from the group consisting of carbon dioxide, ethane, propane and butane, contacting the cooled effluent gases with a moving bed of solid granular adsorbent under a superatmospheric pressure at which acetylene normally decomposes thereby adsorbing acetylene, said stabilizing gas and more readily adsorbable constituents therefrom leaving less readily adsorbable constituents and hydrogen substantially unadsorbed, desorbing the thus adsorbed constituents from said adsorbent, separating acetylene therefrom, and subsequently recycling at least a portion of said substantially unadsorbed gas enriched in hydrogen and injecting said gas into the preheated reactant gas mixture to initiate said acetylene-producing reaction.

4. A process for the production of acetylene which comprises preheating a reactant gas containing normally gaseous hydrocarbon and an oxygen-containing gas to a temperature insufficient to cause substantial reaction, injecting a gaseous mixture of hydrogen and an inert gas into the preheated reactant gas to initiate a non-catalytic partial oxidation acetylene-producing reaction, sustaining said reaction for about 0.001 to 0.05 second, subsequently quenching the effluent gases to stop the acetylene-producing reaction, injecting an inert acetylene stabilizing fluid selected from the group consisting of carbon dioxide, ethane, propane and butane into the cooled effluent gases, compressing the thus formed gaseous mixture to between about 50 and 500 pounds per square inch absolute, contacting the compressed gaseous mixture with a moving bed of granular adsorbent to form a rich adsorbent containing adsorbed acetylene and stabilizing fluid and leaving a hydrogen-enriched gas substantially unadsorbed, recirculating at least part of said hydrogen-enriched gas to initiate said acetylene-producing reaction, desorbing adsorbed constituents from said rich adsorbent, separating acetylene from said stabilizing fluid, and recirculating at least part of said stabilizing fluid for recombination with said cooled effluent gas.

5. A process for the production of acetylene by the partial oxidation of hydrocarbon which comprises preheating a reactant gas mixture of a normally gaseous hydrocarbon and an oxygen-containing gas to an elevated temperature insufficient to cause substantial reaction therebetween, passing said mixture into a reaction zone, injecting thereinto a hydrogen-containing gas thereby initiating a non-catalytic partial oxidation acetylene-producing reaction forming an effluent gas containing acetylene and hydrogen, quench cooling the hot effluent gas thus produced within 0.001 and 0.05 second after initiating said reaction, injecting a sufficient quantity of an inert acetylene stabilizing fluid selected from the group consisting of carbon dioxide, ethane, propane and butane into the cooled effluent to prevent decomposition of the acetylene contained therein during subsequent separation treatment, contacting the mixture thus formed with a moving bed of solid granular adsorbent to adsorb acetylene and said stabilizing fluid leaving less readily adsorbable constituents and hydrogen substantially unadsorbed, subsequently desorbing acetylene and said stabilizing fluid from said adsorbent, separating acetylene in substantially pure form from the desorbed mixture, recirculating at least part of said stabilizing fluid for combination with further quantities of said cooled effluent, enriching a fraction of the unadsorbed gas to increase the hydrogen concentration thereof by contacting said gas with further quantities of said adsorbent, and recirculating at least part of the enriched hydrogen-containing gas thus produced to initiate said acetylene-producing reaction.

6. A process according to claim 5 wherein said mixture of normally gaseous hydrocarbon and oxygen-containing gas is preheated to a temperature sufficient to result in a reaction temperature within the range of from 1100° C. to 1500° C. upon injection of said hydrogen-containing gas.

7. A process according to claim 5 wherein said stabilizing fluid comprises carbon dioxide and wherein a sufficient amount thereof is combined with said effluent gas to raise the carbon dioxide concentration therein to between about 40% and 50% of the concentration of acetylene in said effluent gas.

8. A process according to claim 5 wherein said hydrogen-enriched gas recycled from the adsorption separation step contains between 60% and 90% by volume of hydrogen.

9. A process according to claim 5 wherein said normally gaseous hydrocarbon comprises natural gas and said oxygen-containing gas comprises air mixed in such a proportion that a 20% to 50% by volume excess of oxygen required to convert said natural gas to acetylene exists.

10. A process according to claim 5 wherein said acetylene-producing reaction is effected at a pressure between 5 and 50 pounds per square inch absolute and the adsorptive separation of the effluent gases is effected at a pressure between about 50 and 500 pounds per square inch absolute.

11. A process according to claim 5 wherein said solid granular adsorbent comprises activated granular charcoal employed in amounts of between about 150 and 225 pounds per thousand standard cubic feet of effluent gas.

12. A process according to claim 5 wherein said normally gaseous hydrocarbon contains methane and wherein said effluent gas contains unreacted methane, acetylene, hydrogen, and carbon dioxide, in combination with the steps of recirculating a moving bed of solid granular adsorbent successively through an adsorption zone, a first rectification zone, a second rectification zone and a desorption zone, passing said effluent gas and said added stabilizing fluid through said adsorption zone forming a rich adsorbent containing adsorbed unreacted methane, acetylene, and said stabilizing fluid and leaving less readily adsorbable constituents and hydrogen as a substantially unadsorbed lean gas, contacting said rich adsorbent with a gaseous reflux containing unreacted methane and the more readily adsorbable constituents in said first rectification zone to desorb traces of less readily adsorbable constituents therefrom forming a partially rectified adsorbent, contacting the partially rectified adsorbent in said second rectification zone with a gaseous reflux of acetylene and stabilizing fluid thereby desorbing unreacted methane therefrom leaving a rectified adsorbent, recirculating the thus desorbed methane for retreatment in said acetylene-producing reaction, subsequently desorbing acetylene and said stabilizing fluid in said desorption zone leaving from said rectified adsorbent a lean adsorbent, separating acetylene from said stabilizing fluid and recirculating at least part of the thus recovered stabilizing fluid for combination with said effluent gas.

13. A process for the production of acetylene which comprises forming a reactant gas containing methane and air in such proportion that the hydrocarbon-to-oxygen ratio is between about 1.33 and 2.0, preheating said reactant gas to between about 950° C. and 1150° C., initiating a non-catalytic partial oxidation acetylene producing reaction by injecting into the preheated reactant gas between about 0.5 and about 5.0 mols of hydrogen per mol of hydrocarbon as a gaseous mixture containing between about 60% and 90% by volume of hydrogen, sustaining the acetylene-producing reaction for between about 0.001 and 0.05 second at a temperature between about 1100° C. and 1500° C., quench cooling the reaction product to a temperature less than 650° C., injecting a sufficient amount of an inert acetylene-stabilizing diluent gas selected from the group consisting of carbon dioxide, ethane, propane and butane into said effluent gas to stabilize acetylene at the pressure of adsorptive separation, compressing the resultant gas mixture to between about 50 and about 500 pounds per square inch absolute, contacting the thus compressed gas in an adsorptive separation zone with a moving bed of solid granular adsorbent thereby adsorbing unreacted methane, acetylene, and said stabilizing gas to form a rich adsorbent leaving hydrogen, carbon monoxide and nitrogen substantially unadsorbed, subsequently contacting the unadsorbed gas with further quantities of granular adsorbent forming said gaseous mixture enriched hydrogen, recirculating at least a portion of this hydrogen-enriched gas to initiate said acetylene-producing reaction, subsequently desorbing unreacted methane from said rich charcoal forming a rectified adsorbent, recirculating the thus desorbed methane to form further quantities of acetylene, subsequently desorbing said acetylene and stabilizing gas from said rectified adsorbent, separating acetylene from said stabilizing gas and recirculating at least a portion of said stabilizing gas for stabilization of acetylene in said reaction product.

14. A process according to claim 13 wherein said stabilizing gas is selected from the group consisting of carbon dioxide, ethane, propane and butane, and wherein the quantities employed are sufficient to establish a concentration thereof in said reaction product between 40 to 50%, 30 to 40%, 25 to 35%, and 20 to 30% by volume respectively of the concentration of acetylene contained in said reaction product.

15. A process according to claim 13 wherein said moving bed of granular adsorbent is divided into two separate streams in said adsorptive separation zone in combination with the steps of contacting the mixture of effluent gas and stabilizing gas with the first stream of adsorbent, contacting the subsequently combined first and second streams of adsorbent with an acetylene and stabilizing gas reflux to desorb a mixture of unreacted methane, acetylene and stabilizing gas, contacting the thus desorbed gas with said second stream of adsorbent leaving unreacted methane substantially unadsorbed and separating the methane thus produced from said second stream of adsorbent and employing said methane in preparing said reactant gas mixture.

16. A process according to claim 13 wherein said solid granular adsorbent comprises activated charcoal.

17. An apparatus for the production of acetylene which comprises an acetylene reactor provided with at least one elongated preheating conduit discharging into a reaction chamber which in turn discharges into a quenching chamber inlet means for a reactant gaseous mixture containing a hydrocarbon and oxygen opening into said preheating section for passage therethrough into said reaction chamber, inlet means for a hydrogen-containing gas opening into said reaction chamber, inlet means for introducing a quenching fluid opening into said quenching chamber, a vertical selective adsorption column provided at successively lower levels with an adsorption section, at least one rectification section and a desorption section, conduit means for quenched acetylene-bearing gases communicating said quenching chamber with said adsorption section, a gas compressor disposed in said last-named conduit, means for maintaining said column at a pressure between 100 and 350 p. s. i., means for recirculating granular adsorbent from the bottom to the top of said column, means for maintaining the solid granular adsorbent in the form of a compact bed moving downwardly by gravity successively through said sections, outlet means for the unadsorbed portion of said quenched effluent from said adsorption section, conduit means for an unadsorbed hydrogen-rich gas communicating said adsorption column with said reaction chamber in said reactor, conduit means for unreacted hydrocarbon communicating said rectification section of said adsorption column with said preheating conduit in said reactor, outlet means for desorbed gases containing acetylene and a stabilizing gas from said desorption section communicating with a separating means for separating said stabilizing gas from the desorbed acetylene, and conduit means for at least a portion of said stabilizing gas communicating said separating means with the adsorption section of said selective adsorption column for recycle of stabilizing gas thereto.

18. An apparatus according to claim 17 in combination with means for passing a portion of unadsorbed gas from said adsorption section through a secondary adsorption section forming an enriched hydrogen-containing gas, means for removing unadsorbed gas from said secondary adsorption section for recirculation to said reaction section.

19. A selective adsorption process for the simultaneous separation of hydrogen and acetylene from gaseous mixtures thereof containing nitrogen and/or carbon monoxide which comprises injecting an inert acetylene stabilizing diluent fluid selected from the group consisting of carbon dioxide, ethane, propane and butane adsorbable with the acetylene into said gaseous mixture, compressing the thus formed gaseous mixture to between about 50 and 500 pounds per square inch absolute, contacting the compressed gaseous mixture with a moving bed of granular adsorbent to form a rich adsorbent containing adsorbed acetylene and stabilizing fluid and leaving a hydrocarbon-free hydrogen-enriched gas substantially unadsorbed, desorbing adsorbed constituents from said rich adsorbent, separating said stabilizing fluid from said acetylene and recirculating at least part of said stabilizing fluid for combination with said gaseous mixture.

20. A selective adsorption process for the simultaneous separation of hydrogen from nitrogen and carbon monoxide and the recovery of acetylene from gaseous mixtures containing the same which comprises injecting a sufficient quantity of an inert acetylene stabilizing diluent fluid selected from the group consisting of carbon dioxide, ethane, propane and butane adsorbable with said acetylene into said gaseous mixture to prevent decomposition of the acetylene contained therein during the subsequent adsorptive separation treatment, contacting the mixture thus formed with a moving bed of solid granular adsorbent to adsorb acetylene and said stabilizing fluid leaving less readily adsorbable constituents and hydrogen substantially unadsorbed substantially free of hydrocarbons, subsequently desorbing acetylene and said stabilizing fluid from said adsorbent, separating acetylene in substantially pure form from the desorbed mixture, recirculating at least part of said stabilizing fluid for combination with further quantities of said gaseous mixture, contacting the unadsorbed gas with further quantities of said adsorbent to form an unadsorbed portion of increased hydrogen concentration and removing this gas enriched in hydrogen as a product.

21. A process according to claim 20 in combination with the step of compressing the gaseous mixture containing the injected inert acetylene stabilizing diluent fluid to a pressure between about 50 and 500 pounds per square inch absolute prior to contacting the gaseous mixture with said granular adsorbent.

22. A process according to claim 20 wherein said solid granular adsorbent comprises granular activated charcoal employed in amounts of between about 150 and about 225 pounds per thousand standard cubic feet of said gaseous mixture.

23. A selective adsorption process for the simultaneous separation of hydrogen from nitrogen and the recovery of acetylene from gaseous mixtures containing the same which comprises injecting from 40% to 50% of carbon dioxide based on the quantity of acetylene in said gaseous mixture as an inert acetylene stabilizing diluent fluid into said gaseous mixture to prevent decomposition of the acetylene contained therein during subsequent separation treatment, contacting the mixture thus formed with a moving bed of solid granular adsorbent to adsorb acetylene and said carbon dioxide leaving less readily adsorbable constituents and hydrogen substantially unadsorbed and substantially free of hydrocarbons, subsequently desorbing acetylene and said carbon dioxide from said adsorbent, separating acetylene in substantially pure form from the desorbed mixture, recirculating at least part of said carbon dioxide for combination with further quantities of said gaseous mixture, contacting at least part of the unadsorbed gas with further adsorbent leaving another unadsorbed gas enriched in hydrogen and removing said gas enriched in hydrogen as a product fraction of said gaseous mixture.

24. A selective adsorption process for the simultaneous separation of hydrogen from carbon monoxide and the recovery of methane and acetylene from gaseous mixtures containing the same which comprises injecting an inert acetylene stabilizing fluid selected from the group consisting of carbon dioxide, ethane, propane and butane into said gaseous mixture, subsequently passing said mixture into contact with a moving bed of adsorbent in an adsorption zone forming a rich adsorbent containing adsorbed unreacted methane, acetylene, and said stabilizing fluid and leaving less readily adsorbable constituents and hydrogen as a substantially unadsorbed hydrocarbon-free lean gas, contacting said rich adsorbent with a gaseous reflux containing unreacted methane and the more readily adsorbable constituents in a first rectification zone to desorb traces of less readily adsorbable constituents therefrom forming a partially rectified adsorbent, contacting the partially rectified adsorbent in a second rectification zone with a gaseous reflux of acetylene and stabilizing fluid thereby desorbing methane therefrom leaving a rectified adsorbent, removing the thus desorbed methane therefrom as a product stream, subsequently desorbing acetylene and said stabilizing fluid in said desorption zone from said rectified adsorbent leaving a lean adsorbent, separating acetylene from said stabilizing fluid and recirculating at least part of the thus recovered stabilizing fluid for combination with said gaseous mixture.

25. A selective adsorption process for the simultaneous separation of hydrogen from nitrogen and/or carbon monoxide and the recovery of acetylene and methane from gaseous mixtures containing the same which comprises injecting a sufficient amount of an inert acetylene-stabilizing gas of substantially the same degree of adsorbability as said acetylene and selected from the group consisting of carbon dioxide, ethane, propane and butane into said gaseous mixture to stabilize acetylene at the pressure of adsorptive separation, compressing the resultant gas mixture to between about 50 and about 500 pounds per square inch absolute, contacting the thus compressed gas in an adsorptive separation zone with a moving bed of solid granular adsorbent thereby adsorbing methane, acetylene, and said stabilizing gas to form a rich adsorbent leaving hydrogen, carbon monoxide and/or nitrogen substantially free of hydrocarbons unadsorbed, subsequently contacting the unadsorbed gas with further quantities of granular adsorbent forming a gaseous mixture enriched in hydrogen, removing this hydrogen-enriched gas as a product from the process, subsequently desorbing unreacted methane from said rich adsorbent forming a rectified adsorbent, next desorbing said acetylene and stabilizing gas from said rectified adsorbent, separating said stabilizing gas from said acetylene and injecting at least part thereof into said gaseous mixture.

26. A process according to claim 25 wherein said inert acetylene stabilizing diluent gas is selected from the group consisting of carbon dioxide, ethane, propane and butane, and wherein the quantities employed are sufficient to establish a concentration thereof in said reaction product of from 40 to 50%, 30 to 40%, 25 to 35%, and 20 to 30% by volume respectively of the concentration of acetylene contained in said gaseous mixture.

27. A process according to claim 25 wherein said moving bed of adsorbent is divided into two separate streams in said adsorptive separation zone in combination with the steps of contacting the gaseous mixture containing the injected stabilizing gas with the first stream of adsorbent leaving hydrogen and gases of low adsorbability unadsorbed, contacting the subsequently combined first and second streams of adsorbent with an acetylene and stabilizing gas reflux to desorb a gas mixture containing methane and more readily adsorbable gases, contacting the thus desorbed gas with said second stream of adsorbent leaving the methane substantially unadsorbed and separating the substantially pure methane thus produced as a product stream from said second stream of adsorbent.

28. An apparatus for the simultaneous separation of hydrogen from nitrogen and/or carbon monoxide and of acetylene from gaseous mixtures containing the same which comprises a vertical selective adsorption column provided at successively lower levels with an adsorption section, at least one rectification section and a desorption section, conduit means for acetylene- and hydrogen-bearing gases opening into said adsorption section, means for recirculating granular adsorbent from the bottom to the top of said column, means for maintaining the solid granular adsorbent in the form of a compact bed moving downwardly by gravity successively through said sections, outlet means for unadsorbed hydrogen-containing portion of said gaseous mixture from said adsorption section, conduit means for a fraction of intermediate adsorbability opening from a rectification section, outlet conduit means for desorbed gases containing acetylene and an inert acetylene stabilizing diluent fluid communicating said desorption section with a separating means for separating said stabilizing fluid from said acetylene, conduit means for said stabilizing fluid communicating said separating means with said inlet conduit opening into said adsorption section, and outlet conduit means for acetylene-bearing gases free of said stabilizing fluid from said separating means.

29. An apparatus according to claim 28 wherein said selective adsorption column is provided with an adsorbent cooling section, means for passing at least part of the unadsorbed hydrogen-containing gas from said adsorption section countercurrent to adsorbent flowing through said cooling section counter-current thereto, outlet conduit means for a hydrogen-enriched portion of said unadsorbed gas from above said cooling section and means for combining in various proportions said hydrogen-enriched gas withdrawn therefrom with the remaining portion of said unadsorbed gas withdrawn from said adsorption section.

References Cited in the file of this patent

UNITED STATES PATENTS

| Number | Name | Date |
|---|---|---|
| 2,167,471 | Auerbach | July 25, 1939 |
| 2,498,444 | Orr | Feb. 21, 1950 |
| 2,519,342 | Berg | Aug. 22, 1950 |
| 2,519,873 | Berg | Aug. 22, 1950 |
| 2,529,289 | Gilliland | Nov. 7, 1950 |
| 2,549,240 | Robinson | Apr. 17, 1951 |

FOREIGN PATENTS

| Number | Country | Date |
|---|---|---|
| 332,731 | Great Britain | July 31, 1930 |
| 349,067 | Great Britain | May 14, 1931 |